United States Patent
Yu et al.

(10) Patent No.: US 12,003,319 B2
(45) Date of Patent: Jun. 4, 2024

(54) DATA TRANSMISSION METHOD AND APPARATUS

(71) Applicant: Huawei Technologies Co., Ltd., Shenzhen (CN)

(72) Inventors: Siqing Yu, Dongguan (CN); Mujie Zou, Dongguan (CN); Yumeng Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 17/583,685

(22) Filed: Jan. 25, 2022

(65) Prior Publication Data

US 2022/0149979 A1 May 12, 2022

Related U.S. Application Data

(63) Continuation of application No. PCT/CN2020/104811, filed on Jul. 27, 2020.

(30) Foreign Application Priority Data

Jul. 26, 2019 (CN) .......................... 201910680722.9

(51) Int. Cl.
*H04L 47/24* (2022.01)
*H04L 1/00* (2006.01)

(52) U.S. Cl.
CPC ............ *H04L 1/0006* (2013.01); *H04L 47/24* (2013.01)

(58) Field of Classification Search
None
See application file for complete search history.

(56) References Cited

U.S. PATENT DOCUMENTS

| 10,218,602 | B2 | 2/2019 | Levy-Abegnoli et al. |
| 10,225,196 | B2 | 3/2019 | Shor et al. |
| 2006/0272025 | A1* | 11/2006 | Mononen ................ H04L 47/24 726/26 |

(Continued)

FOREIGN PATENT DOCUMENTS

| CN | 109120591 A | 1/2019 |
| CN | 109962863 A | 7/2019 |

(Continued)

OTHER PUBLICATIONS

IEEE Std 802.1Qbu-2016 (Amendment to IEEE Std 802.1Q-2014), "IEEE Standard for Local and metropolitan area networks—Bridges and Bridged Networks—Amendment 26: Frame Preemption," 2016, 52 pages.

(Continued)

*Primary Examiner* — The Hy Nguyen
(74) *Attorney, Agent, or Firm* — Conley Rose, P.C.

(57) ABSTRACT

In a data transmission method, if a to-be-transmitted second data frame exists in a process in which a network device transmits a first data frame, and a priority of the second data frame is higher than a priority of the first data frame, the network device determines a frame type of the second data frame as an express frame. The network device adjusts a frame type of the first data frame to a preemptable frame if the frame type of the first data frame is an express frame. Then, the network device stops transmitting the first data frame, and starts to transmit the second data frame.

20 Claims, 5 Drawing Sheets

(56) References Cited

U.S. PATENT DOCUMENTS

| | | |
|---|---|---|
| 2008/0285459 A1 | 11/2008 | Diab et al. |
| 2009/0160943 A1 | 6/2009 | Badt, Jr. et al. |
| 2017/0041243 A1* | 2/2017 | Nakayasu ........... H04L 12/4625 |
| 2018/0041432 A1* | 2/2018 | Göetz ................. H04L 12/2859 |
| 2018/0092113 A1 | 3/2018 | Negoto et al. |
| 2018/0103094 A1 | 4/2018 | Wetterwald et al. |
| 2019/0199641 A1 | 6/2019 | Lo Bello et al. |
| 2020/0153722 A1* | 5/2020 | Datta .................... H04L 47/245 |
| 2022/0149979 A1* | 5/2022 | Yu ........................ H04L 1/0006 |

FOREIGN PATENT DOCUMENTS

| | | | | |
|---|---|---|---|---|
| JP | 3169511 B2 * | 5/2001 | ......... | G06F 12/0866 |
| JP | 2016103700 A * | 6/2016 | | |
| JP | 2018055284 A | 4/2018 | | |
| WO | 2016132402 A1 | 8/2016 | | |

OTHER PUBLICATIONS

IEEE Std 802.3br (Amendment to IEEE Std 802.3-2015 as amended by IEEE Std 802.3bw-2015, IEEE Std 802.3by-2016, IEEE Std 802.3bq-2016, and IEEE Std 802.3bp-2016) "IEEE Standard for Ethernet—Amendment 5: Specification and Management Parameters for Interspersing Express Traffic," 2016, 58 pages.

* cited by examiner

DATA TRANSMISSION METHOD AND APPARATUS

CROSS-REFERENCE TO RELATED APPLICATIONS

This is a continuation of Int'l Patent App. No. PCT/CN2020/104811, filed on Jul. 27, 2020, which claims priority to Chinese Patent App. No. 201910680722.9, filed on Jul. 26, 2019, both of which are incorporated by reference.

FIELD

This disclosure relates to the field of network technologies, and in particular, to a data transmission method and apparatus.

BACKGROUND

A data frame is forwarded between a transmit end and a receive end by using a network device to implement communication. The data frame may also be referred to as a medium access control (MAC) frame. The network device usually forwards a data frame by using a "best effort" forwarding policy. In the forwarding policy, the network device forwards data frames in a sequence of the received data frames. However, data frames of different priorities exist in an actual network. When the network device forwards the data frames by using the forwarding policy, a low-priority data frame occupies a channel, and consequently a high-priority data frame cannot be transmitted in time, causing a relatively large transmission latency of the high-priority data frame.

A frame preemption mechanism is introduced in Time-Sensitive Networking (TSN). In frame preemption mechanisms defined in Institute of Electrical and Electronics Engineers (IEEE) 802.3br and IEEE 802.1Qbu, frame types of data frames are classified into two types: an express frame and a preemptable frame. A transmission priority of the express frame is higher than a transmission priority of the preemptable frame. When a to-be-transmitted second data frame whose frame type is an "express frame" exists in a process in which a network device transmits a first data frame whose frame type is a "preemptable frame", the network device stops transmitting the first data frame, and starts to transmit the second data frame; and continues to transmit the first data frame after the transmission of the second data frame ends, to ensure low-latency transmission of the "express frame".

However, in a conventional frame preemption mechanism, data frames are classified into two types: an express frame and a preemptable frame, and only the "express frame" is allowed to preempt the "preemptable frame" for preferential transmission. If a network device has data frames of more than two priorities, for example, includes data frames of a total of eight priorities: 0 to 7, preferential transmission of a high-priority data frame cannot be truly ensured.

SUMMARY

This disclosure provides a data transmission method and apparatus, to resolve a problem that preferential transmission of a high-priority data frame cannot be truly ensured in a conventional frame preemption mechanism.

According to a first aspect, a data transmission method is provided, where the method includes: if a to-be-transmitted second data frame exists in a process of transmitting a first data frame, and a priority of the second data frame is higher than a priority of the first data frame, a network device determines a frame type of the second data frame as an express frame; the network device adjusts a frame type of the first data frame to a preemptable frame if the frame type of the first data frame is an express frame; and the network device stops transmitting the first data frame, and starts to transmit the second data frame.

The network device dynamically adjusts a frame type of a currently transmitted data frame, so that in the network device, a frame type of a high-priority data frame is an express frame, and a frame type of a low-priority data frame is a preemptable frame. In comparison with a conventional manner in which frame types of data frames are classified into fixed types, a frame type of a data frame can be more flexibly determined, so that a high-priority data frame flexibly preempts a low-priority data frame, thereby improving data transmission flexibility.

In a possible implementation, the adjusting a frame type of the first data frame to a preemptable frame if the frame type of the first data frame is an express frame includes: if the frame type of the first data frame is an express frame, a third data frame preempted by the first data frame for transmission exists, and a frame type mark of the third data frame is a first preemptable frame mark, the network device adjusts a frame type mark of the first data frame to a second preemptable frame mark, where the second preemptable frame mark is different from the first preemptable frame mark.

A preemptable frame mark may be extended to distinguish between different data frames whose frame types are all preemptable frames, or an indication field may be added to a frame structure of a data fragment to distinguish between different data frames whose frame types are all preemptable frames.

In another possible implementation, the adjusting a frame type of the first data frame to a preemptable frame if the frame type of the first data frame is an express frame includes: if the frame type of the first data frame is an express frame and a third data frame preempted by the first data frame for transmission does not exist, the network device adjusts the frame type of the first data frame to a preemptable frame.

This implementation may be compatible with an existing transmission manner, to ensure that only one preemptable frame in the network device is preempted for transmission.

Optionally, the network device continues to transmit the first data frame after the transmission of the second data frame ends.

Optionally, that the network device continues to transmit the first data frame includes: after the transmission of the second data frame ends, if a to-be-transmitted fourth data frame exists and a priority of the fourth data frame is higher than the priority of the first data frame, the network device determines a frame type of the fourth data frame as an express frame, and transmits the fourth data frame; and the network device continues to transmit the first data frame after the transmission of the fourth data frame ends.

A high-priority data frame may be preferentially transmitted compared with a low-priority data frame.

According to a second aspect, another data transmission method is provided, where the method includes: if a network device detects that a to-be-transmitted second data frame exists in a process of transmitting a first data frame, a frame type of the first data frame is the same as a frame type of the second data frame, and a priority of the second data frame is higher than a priority of the first data frame, the network device determines the frame type of the first data frame as a preemptable frame and the frame type of the second data frame as an express frame; and the network device stops transmitting the first data frame, and starts to transmit the second data frame.

A frame type of a currently transmitted data frame or a data frame in an egress port queue is dynamically adjusted, so that in the network device, a frame type of a high-priority data frame is an express frame, and a frame type of a low-priority data frame is a preemptable frame. Therefore, in data frames of a same frame type, a high-priority data frame flexibly preempts a low-priority data frame, thereby improving data transmission flexibility.

Optionally, the determining the frame type of the first data frame as a preemptable frame and the frame type of the second data frame as an express frame includes: adjusting the frame type of the first data frame to a preemptable frame if the frame type of the first data frame and the frame type of the second data frame are both express frames; or adjusting the frame type of the second data frame to an express frame if the frame type of the first data frame and the frame type of the second data frame are both preemptable frames.

In a possible implementation, the adjusting the frame type of the first data frame to a preemptable frame if the frame type of the first data frame and the frame type of the second data frame are both express frames includes: if the frame type of the first data frame and the frame type of the second data frame are both express frames, a third data frame preempted by the first data frame for transmission exists, and a frame type mark of the third data frame is a first preemptable frame mark, adjusting a frame type mark of the first data frame to a second preemptable frame mark, where the second preemptable frame mark is different from the first preemptable frame mark.

In another possible implementation, the adjusting the frame type of the first data frame to a preemptable frame if the frame type of the first data frame and the frame type of the second data frame are both express frames includes: if the frame type of the first data frame and the frame type of the second data frame are both express frames and a third data frame preempted by the first data frame for transmission does not exist, adjusting the frame type of the first data frame to a preemptable frame.

Optionally, the network device continues to transmit the first data frame after the transmission of the second data frame ends.

Optionally, the continuing to transmit the first data frame after the transmission of the second data frame ends includes: after the transmission of the second data frame ends, if a to-be-transmitted fourth data frame exists and a priority of the fourth data frame is higher than the priority of the first data frame, the network device transmits the fourth data frame; and the network device continues to transmit the first data frame after the transmission of the fourth data frame ends.

According to a third aspect, a data transmission apparatus is provided. The apparatus includes a plurality of functional modules, and the plurality of functional modules interact to implement the method in the first aspect and the implementations of the first aspect. The plurality of functional modules may be implemented based on software, hardware, or a combination of software and hardware, and the plurality of functional modules may be randomly combined or divided based on a specific implementation.

According to a fourth aspect, another data transmission apparatus is provided. The apparatus includes a plurality of functional modules, and the plurality of functional modules interact to implement the method in the second aspect and the implementations of the second aspect. The plurality of functional modules may be implemented based on software, hardware, or a combination of software and hardware, and the plurality of functional modules may be randomly combined or divided based on a specific implementation.

According to a fifth aspect, a processing chip is provided. The processing chip includes a programmable logic circuit and/or program instructions, and the processing chip runs the programmable logic circuit and/or the program instructions to implement the data transmission method according to either the first aspect or the second aspect.

Optionally, the processing chip includes a processing unit and a scheduling unit; the processing unit is configured to buffer a to-be-transmitted data frame in a corresponding egress port queue based on a priority of the to-be-transmitted data frame; and the scheduling unit is configured to schedule the to-be-transmitted data frame in the egress port queue, to implement the data transmission method according to either the first aspect or the second aspect.

Optionally, the scheduling unit includes data egress scheduling logic and media access control MAC encapsulation logic; the data egress scheduling logic is configured to schedule the to-be-transmitted data frame in the egress port queue, and provide the MAC encapsulation logic with a frame type indication corresponding to the to-be-transmitted data frame, where the frame type indication is used to indicate a frame type of the to-be-transmitted data frame; and the MAC encapsulation logic is configured to perform MAC encapsulation on the to-be-transmitted data frame based on the frame type indication corresponding to the to-be-transmitted data frame.

Optionally, the processing chip further includes a memory. The memory is configured to buffer the to-be-transmitted data frame. Specifically, the memory includes storage space allocated to the egress port queue.

Optionally, the processing unit includes at least one of a network processor and a central processing unit, and the scheduling unit includes at least one of an application-specific integrated circuit (ASIC) and a programmable logic device (PLD). Optionally, the memory is further configured to store computer program instructions, and the processing unit invokes the computer program instructions stored in the memory, to perform one or more steps of the data transmission method according to the first aspect or the second aspect.

According to a sixth aspect, a data transmission apparatus is provided, including a communications interface and the processing chip according to the fifth aspect.

The communications interface may be connected to the processing chip by using a communications bus.

The data transmission apparatus further includes a memory, the memory stores a computer program, and the computer program includes program instructions. The processing chip invokes the computer program stored in the memory, to perform one or more steps of the data transmission method according to the first aspect or the second aspect.

According to a seventh aspect, a computer storage medium is provided. The computer storage medium stores instructions. When the instructions are executed by a processor, the data transmission method according to any one of the first aspect and the implementations thereof is implemented, or the data transmission method according to any one of the second aspect and the implementations thereof is implemented.

Beneficial effects brought by the technical solutions provided in this disclosure may include at least the following:

A frame type of a currently transmitted data frame and/or a frame type of a to-be-transmitted data frame are/is dynamically adjusted, so that in the currently transmitted data frame and the to-be-transmitted data frame, a frame type of a higher-priority data frame is an express frame, and a frame type of a lower-priority data frame is a preemptable frame. Therefore, a high-priority data frame flexibly preempts a low-priority data frame, thereby improving data transmission flexibility.

DETAILED DESCRIPTION

Figure 1:
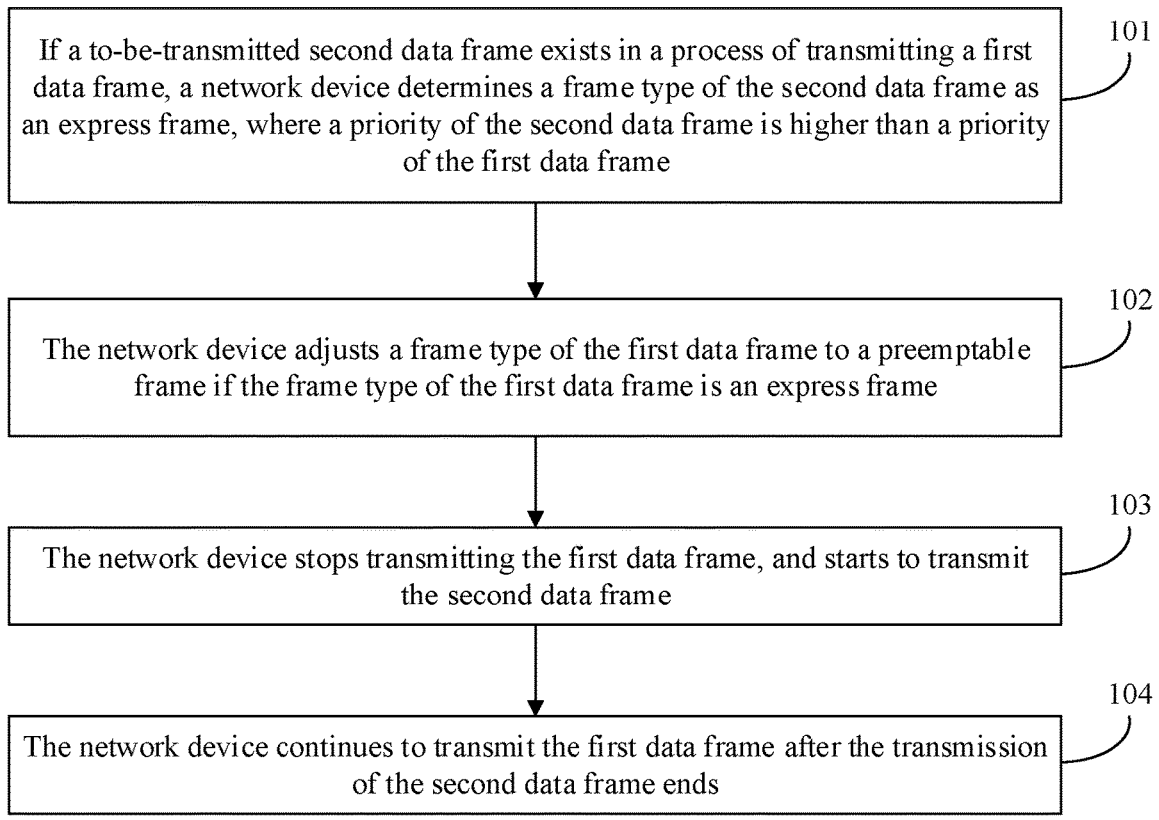
FIG. 1 is a flowchart of a data transmission method according to an embodiment.

To make the objectives, technical solutions, and advantages of this disclosure clearer, the following further describes the implementations in detail with reference to the accompanying drawings.

A data transmission method provided in the embodiments may be applied to a network device in a communications network. Optionally, the communications network may be an industrial network, an in-vehicle network, a data center network (DCN), a metropolitan area network, a wide area network, a campus network, or the like. A scenario of the data transmission method is not limited in the embodiments. The network device may be a router, a switch, a server, or the like. The network device buffers all to-be-sent data frames in egress port queues, and then transmits the data frames in the egress port queues by using corresponding ports.

Currently, the network device may classify data frames into data frames of a plurality of priorities, for example, eight priorities or 16 priorities. This is not limited in this embodiment. The following embodiments provide descriptions by using an example in which a network device classifies data frames into data frames of eight priorities, including priorities 0 to 7. A larger priority value indicates a higher priority. The network device may include eight egress port queues, and each egress port queue is used to buffer a data frame of one priority. In some scenarios, the egress port queue may also be referred to as a class of service queue (COSQ) or a priority queue. In some scenarios, there are a plurality of mapping relationships between the egress port queue and the priority queue. There is a one-to-one correspondence between a priority of an egress port queue and a priority of a data frame buffered in the egress port queue.

When forwarding data frames, the network device forwards the data frames in egress port queues in descending order of priorities. For example, assuming that the network device includes three egress port queues that buffer data frames, including a first egress port queue of a priority 2, a second egress port queue of a priority 5, and a third egress port queue of a priority 6, the first egress port queue buffers a data frame of a priority 2, the second egress port queue buffers a data frame of a priority 5, and the third egress port queue buffers a data frame of a priority 6, when forwarding the data frames, the network device first transmits the data frame in the third egress port queue, then transmits the data frame in the second egress port queue, and finally transmits the data frame in the first egress port queue.

Further, in a process in which the network device transmits a first data frame of the priority 5 in the second egress port queue, if the third egress port queue receives a to-be-transmitted second data frame, based on a conventional frame preemption mechanism: if a frame type of the second egress port queue is set to a preemptable frame, that is, a frame type of the first data frame of the priority 5 is a preemptable frame, and a frame type of the third egress port queue is set to an express frame, that is, a frame type of the second data frame of the priority 6 is an express frame, the network device stops transmitting the first data frame in the second egress port queue, and starts to transmit the second data frame in the third egress port queue; and after the transmission of the second data frame in the third egress port queue ends, the network device continues to transmit the first data frame in the second egress port queue, that is, the second data frame of the priority 6 can interrupt transmission of the first data frame of the priority 5 for preemptive transmission; or if a frame type of the second egress port queue is the same as a frame type of the third egress port queue, for example, the frame type of the second egress port queue and the frame type of the third egress port queue are both express frames or both preemptable frames, the network device transmits the second data frame in the third egress port queue after the transmission of the first data frame in the second egress port queue ends.

In the conventional frame preemption mechanism, a frame type of a data frame stored in an egress port queue is set to a frame type set for the egress port queue. The frame type of the data frame may be marked by using a value of a specific field in the data frame. For example, the data frame includes a start MAC-merge-packet delimiter (SMD) field, and the frame type of the data frame may be represented by using a value of the SMD field.

In a conventional frame type classification mechanism, a frame type of a data frame is preset to a fixed type. For example, frame types of data frames of priorities 0 to 3 are all set to preemptable frames, and frame types of data frames of priorities 4 to 7 are all set to express frames. Therefore, a high-priority data frame of a same frame type cannot interrupt a low-priority data frame for preemptive transmission, causing relatively low data transmission flexibility in a conventional implementation. In the data transmission method provided in the embodiments, a frame type of a data frame is dynamically adjusted, so that in a currently transmitted data frame and a to-be-transmitted data frame, a frame type of a higher-priority data frame is an express frame, and a frame type of a lower-priority data frame is a preemptable frame. In comparison with a conventional manner in which frame types of data frames are classified into fixed types, a frame type of a data frame can be flexibly determined, so that a high-priority data frame flexibly preempts a low-priority data frame. Therefore, data frame multi-level preemptive-transmission can be implemented, thereby improving data transmission flexibility.

FIG. 1 is a flowchart of a data transmission method according to an embodiment. As shown in FIG. 1, the method includes the following steps.

Step 101: If a to-be-transmitted second data frame exists in a process of transmitting a first data frame, a network device determines a frame type of the second data frame as an express frame, where a priority of the second data frame is higher than a priority of the first data frame.

Because the network device transmits data frames in descending order of priorities, in the process in which the network device transmits the first data frame, a data frame whose priority is lower than or equal to the priority of the first data frame in the network device does not preempt the first data frame for transmission, that is, does not affect the transmission of the first data frame. Therefore, in the process of transmitting the first data frame, the network device only needs to determine whether the second data frame whose priority is higher than the priority of the first data frame exists in the network device. If the to-be-transmitted second data frame exists in the process of transmitting the first data frame, and the priority of the second data frame is higher than the priority of the first data frame, which indicates that the second data frame needs to preempt the first data frame for transmission, the network device may determine the frame type of the second data frame as an express frame.

The to-be-transmitted second data frame in the network device may be received from another device (for example, a transmit end), or may be generated by the network device.

Optionally, before transmitting the first data frame, the network device further buffers the first data frame in a corresponding egress port queue, for example, a first egress port queue, based on the priority of the first data frame. Before step 101, the network device further buffers the second data frame in a corresponding egress port queue, for example, a second egress port queue, based on the priority of the to-be-transmitted second data frame.

Step 102: The network device adjusts a frame type of the first data frame to a preemptable frame if the frame type of the first data frame is an express frame.

The network device may determine the frame type of the first data frame based on a value of an SMD field in the first data frame. The network device adjusts the frame type of the first data frame to a preemptable frame if the frame type of the first data frame is an express frame, so that the second data frame of the higher priority can preempt the first data frame of the lower priority for transmission, thereby ensuring low-latency transmission of a high-priority data frame. If the frame type of the first data frame is a preemptable frame, the network device may directly perform subsequent step 103 without performing step 102.

Step 103: The network device stops transmitting the first data frame, and starts to transmit the second data frame.

Because the frame type of the first data frame is a preemptable frame, and the frame type of the second data frame is an express frame, based on a frame preemption mechanism, the second data frame can preempt the first data frame for transmission, that is, the network device can stop transmitting the first data frame, and preferentially transmit the second data frame.

Step 104: The network device continues to transmit the first data frame after the transmission of the second data frame ends.

Optionally, a frame type of the first data frame transmitted by the network device after the network device is powered on is an express frame. Alternatively, after being powered on, the network device determines whether a priority of the first to-be-transmitted data frame is a lowest priority supported by the network device; and if the priority of the first data frame is not the lowest priority supported by the network device, determines a frame type of the first data frame as an express frame; or if the priority of the first data frame is the lowest priority supported by the network device, determines a frame type of the first data frame as a preemptable frame. Because a data frame of the lowest priority does not need to preempt another data frame for transmission, in this embodiment, the network device can determine frame types of all data frames of the lowest priority as preemptable frames. The first data frame may be the first data frame transmitted by the network device after the network device is powered on, or may be a subsequently transmitted data frame. This is not limited in this embodiment.

In this embodiment, data frames of a same priority do not preempt each other for transmission.

In this embodiment, when obtaining the second data frame of the higher priority in the process of transmitting the first data frame, the network device determines the frame type of the second data frame as an express frame. For example, when a to-be-transmitted data frame of a priority 1 exists in a process of transmitting a data frame of a priority 0, the network device may determine a frame type of the data frame of the priority 1 as an express frame. For another example, when a to-be-transmitted data frame of a priority 7 exists in a process of transmitting a data frame of a priority 6, the network device may determine a frame type of the data frame of the priority 7 as an express frame. In comparison with the current frame type classification mechanism, flexibility of determining a frame type of a data frame is improved.

Specifically, a first possible implementation of step 102 includes: if the frame type of the first data frame is an express frame, a third data frame preempted by the first data frame for transmission exists in the network device, and a frame type mark of the third data frame is a first preemptable frame mark, the network device adjusts a frame type mark of the first data frame to a second preemptable frame mark, where the second preemptable frame mark is different from the first preemptable frame mark.

Optionally, if the network device has eight egress port queues (priority queues), respectively corresponding to priorities 0 to 7, at most seven data frames in the network device are preempted for transmission in a data frame transmission process. For example, if a to-be-transmitted data frame of the priority 1 exists in the network device in a process of transmitting a data frame of the priority 0, the data frame of the priority 1 preempts the data frame of the priority 0 for transmission; and if a to-be-transmitted data frame of the priority 2 exists in the network device in a process of transmitting the data frame of the priority 1, the data frame of the priority 2 preempts the data frame of the priority 1 for transmission. By analogy, a high-priority data frame sequentially preempts low-priority data frames for transmission, and therefore at most seven data frames in the network device are preempted for transmission. In this embodiment, different preemptable frame marks, for example, a preemptable frame mark 1, a preemptable frame mark 2, . . . , and a preemptable frame mark 7, may be used to distinguish between different data frames whose frame types are preemptable frames.

Figure 2:
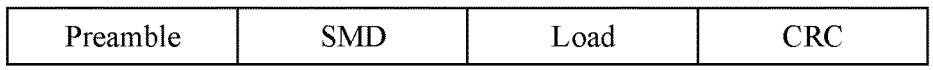
FIG. 2 is a schematic diagram of a frame structure of a data frame according to an embodiment.

FIG. 2 is a schematic diagram of a frame structure of a data frame defined in IEEE 802.3br. As shown in FIG. 2, the data frame includes a preamble, an SMD field, a load field, and a cyclic redundancy check (CRC) field. In the data frame shown in FIG. 2, a length of the preamble is 7 octets, a length of an SMD field is 1 octet, a length of the load field is greater than or equal to 60 octets, and a length of the CRC field is 4 octets.

Figure 3:
FIG. 3 is a schematic diagram of a frame structure of another data frame according to an embodiment.

FIG. 3 is a schematic diagram of a frame structure of another data frame defined in IEEE 802.3br. As shown in FIG. 3, the data frame includes a preamble, an SMD field, a FRAG COUNT field, a load field, and a CRC field. In the data frame shown in FIG. 3, a length of the preamble is 6 octets, a length of the FRAG COUNT field is 1 octet, a length of an SMD field is 1 octet, a length of the load field is greater than or equal to 60 octets, and a length of the CRC field is 4 octets.

In a standard defined in IEEE 802.3br, a frame structure of the first data fragment (referred to as a "preemptable frame first-fragment" below) of an express frame, a complete preemptable frame, or a preemptable frame preempted for transmission is shown in FIG. 2; and a frame structure of a data fragment (referred to as a "preemptable frame subsequent-fragment" below) other than the first data fragment in the preemptable frame preempted for transmission is shown in FIG. 3, and a FRAG COUNT field is used to indicate that the data fragment belongs to a same data frame as a previous data fragment. Each data fragment of the data frame preempted for transmission may be considered as one data subframe. A receive end determines a frame type of a data frame as an express frame or a preemptable frame based on a value of an SMD field in the data frame, and determines, based on whether a FRAG COUNT field exists in the data frame, whether the data frame belong to a same data frame as a previously transmitted data frame.

In the standard defined in IEEE 802.3br, an express frame mark is SMD-E, a preemptable frame mark (referred to as a "first-fragment preemptable frame mark" below) of the first data fragment of the preemptable frame includes SMD-S0, SMD-S1, SMD-S2, and SMD-S3, and a preemptable frame mark (referred to as a "subsequent preemptable frame mark" below) other than that of the first data fragment of the preemptable frame includes SMD-C0, SMD-C1, SMD-C2, and SMD-C3. In the IEEE 802.3br standard, the frame type marks SMD-E, SMD-S0 to SMD-S3, and SMD-C0 to SMD-C3 are separately identified by using different values. For example, a value corresponding to the frame type mark SMD-E is 0xD5. For values of the other frame type marks, refer to the standard. The values are not listed one by one herein.

In the first possible implementation of step 102, a frame structure of the express frame is still the frame structure that is defined in IEEE 802.3br and that is shown in FIG. 2. However, an express frame mark needs to be extended, and a total quantity of express frame marks obtained after the extension is the same as a quantity of priority queues in the network device.

For example, the network device includes eight priority queues (egress port queues). Based on the frame preemption mechanism provided in this embodiment, at most seven data frames in the network device are preempted for transmission in a data frame transmission process, that is, frame types of seven data frames in the network device may be adjusted from express frames to preemptable frames in the data frame transmission process. Therefore, in this embodiment, the express frame mark is extended based on the express frame mark SMD-E defined in the IEEE 802.3br standard, and the defined express frame mark SMD-E is used as SMD-E0, and new express frame marks SMD-E1 to SMD-E7 are obtained after the extension, so that express frame marks obtained after the extension include a total of eight express frame marks: SMD-E0 to SMD-E7. In this embodiment, when a frame type of a data frame is an express frame, an express frame mark of the data frame may be determined based on a priority of the data frame, so that the priority is in a one-to-one correspondence with the express frame mark. For example, if a frame type of a data frame of a priority 7 is an express frame, an express frame mark of the data frame of the priority 7 is SMD-E7; if a frame type of a data frame of a priority 6 is an express frame, an express frame mark of the data frame of the priority 6 is SMD-E6; and so on. Certainly, alternatively, the express frame mark of the data frame of the priority 7 is SMD-E0; the express frame mark of the data frame of the priority 6 is SMD-E1; and so on.

Further, this embodiment provides two manners of distinguishing a data frame to which a preemptable frame subsequent-fragment belongs.

Manner 1: A frame structure of the preemptable frame subsequent-fragment is still the frame structure that is defined in IEEE 802.3br and that is shown in FIG. 3, and a subsequent preemptable frame mark is extended. A total quantity of subsequent preemptable frame marks obtained after the extension is four times the quantity of priority queues in the network device. A FRAG-COUNT field in the preemptable frame subsequent-fragment still follows a definition in the IEEE 802.3br, and may not be extended. The FRAG-COUNT field is cyclically used by using four subsequent fragments as one cycle. That is, a FRAG-COUNT field of the first preemptable frame subsequent-fragment of a data frame is FRAG-COUNT0, whose value is 0xE6; a FRAG-COUNT field of the second preemptable frame subsequent-fragment of the data frame is FRAG-COUNT1, whose value is 0x4C; a FRAG-COUNT field of the third preemptable frame subsequent-fragment of the data frame is FRAG-COUNT2, whose value is 0x7F; a FRAG-COUNT field of the fourth preemptable frame subsequent-fragment of the data frame is FRAG-COUNT3, whose value is 0xB3; a FRAG-COUNT field of the fifth preemptable frame subsequent-fragment of the data frame is FRAG-COUNT0, whose value is 0xE6; . . . .

Similarly, for example, the network device includes eight priority queues. In this embodiment, the subsequent preemptable frame marks SMD-C0 to SMD-C3 defined in IEEE 802.3br may be extended to SMD-C0 to SMD-C31, and values of the subsequent preemptable frame marks SMD-C0 to SMD-C31 are different from each other. Each four subsequent preemptable frame marks are one group. For example, SMD-C0 to SMD-C3 are one group, SMD-C4 to SMD-C7 are one group, and SMD-C24 to SMD-C27 are one group. Each group of subsequent preemptable frame marks corresponds to one express frame mark. For example, SMD-E0 corresponds to SMD-C0 to SMDC3, SMD-E1 corresponds to SMD-C4 to SMDC7, . . . , and SMD-E7 corresponds to SMD-C28 to SMD-C31. Certainly, SMD-C0 to SMD-C31 may be grouped in another manner. This is not limited in this disclosure. For example, if a data frame whose frame type mark is an express frame mark SMD-E0 is adjusted to a preemptable frame, frame type marks of preemptable frame subsequent-fragments of the data frame may be subsequent preemptable frame marks SMD-C0 to SMD-C3, and corresponding FRAG-COUNT fields still follow the definition in IEEE 802.3br and include FRAG-COUNT0 (whose value is 0xE6) to FRAG-COUNT3 (whose value is 0xB3); if a data frame whose frame type mark is an express frame mark SMD-E1 is adjusted to a preemptable frame, frame type marks of preemptable frame subsequent-fragments of the data frame may be subsequent preemptable frame marks SMD-C4 to SMD-C7, and corresponding FRAG-COUNT fields still follow the definition in IEEE 802.3br and are also FRAG-COUNT0 (whose value is 0xE6) to FRAG-COUNT3 (whose value is 0xB3); . . . ; if a data frame whose frame type mark is an express frame mark SMD-E6 is adjusted to a preemptable frame, frame type marks of preemptable frame subsequent-fragments of the data frame may be subsequent preemptable frame marks SMD-C24 to SMD-C27; and if a data frame whose frame type mark is an express frame mark SMD-E7 is adjusted to a preemptable frame, frame type marks of preemptable frame subsequent-fragments of the data frame may be subsequent preemptable frame marks SMD-C28 to SMD-C31. Certainly, alternatively, if a data frame whose frame type mark is an express frame mark SMD-E7 is adjusted to a preemptable frame, frame type marks of preemptable frame subsequent-fragments of the data frame may be subsequent preemptable frame marks SMD-C0 to SMD-C3, and corresponding FRAG-COUNT fields still follow the definition in IEEE 802.3br and are also FRAG-COUNT0 (whose value is 0xE6) to FRAG-COUNT3 (whose value is 0xB3); if a data frame whose frame type mark is an express frame mark SMD-E6 is adjusted to a preemptable frame, frame type marks of preemptable frame subsequent-fragments of the data frame may be subsequent preemptable frame marks SMD-C4 to SMD-C7; . . . ; and if a data frame whose frame type mark is an express frame mark SMD-E0 is adjusted to a preemptable frame, frame type marks of preemptable frame subsequent-fragments of the data frame may be subsequent preemptable frame marks SMD-C28 to SMD-C31.

After receiving a data frame, the receive end may determine, based on a frame structure, whether the data frame is a data fragment of a data frame preempted for transmission. If the data frame is a data fragment of a data frame preempted for transmission, the receive end may determine, based on a value of an SMD field in the data frame, a preciously received data fragment that belongs to or preciously received data fragments that belong to the same data frame as the data fragment.

Figure 4:
FIG. 4 is a schematic diagram of a frame structure of still another data frame according to an embodiment.

Manner 2: A new frame structure of the preemptable frame subsequent-fragment, for example, a frame structure shown in FIG. 4, is defined. For the frame structure of the preemptable frame subsequent-fragment shown in FIG. 4, an indication field is added based on the frame structure of the preemptable frame subsequent-fragment defined in IEEE 802.3br. The indication field is used to indicate a preciously transmitted data fragment that belongs to or preciously transmitted data fragments that belong to a same data frame as the data fragment. As shown in FIG. 4, the preemptable frame subsequent-fragment includes a preamble, an SMD field, a FRAG COUNT field, the indication field, a load field, and a CRC field. A value of the indication field may be the same as a value of an SMD field in a target data fragment, and the target data fragment is the first data fragment that belongs to the same data frame as the preemptable frame subsequent-fragment. For example, if a value of an SMD field in the first data fragment of a first data frame preempted for transmission is 0xD5, values of indication fields in the second data fragment and a subsequent data fragment of the first data frame are both 0xD5. In this optional implementation, for a setting manner of a value of the SMD field in the preemptable frame subsequent-fragment shown in FIG. 4, still refer to SMD-C0 to SMD-C3 defined in IEEE 802.3br. Details are not described in this embodiment.

A second possible implementation of step 102 includes: if the frame type of the first data frame is an express frame and a third data frame preempted by the first data frame for transmission does not exist in the network device, the network device adjusts the frame type of the first data frame to a preemptable frame.

If the frame type of the first data frame is an express frame, and a third data frame preempted by the first data frame for transmission exists in the network device, the network device does not adjust the frame type of the first data frame. That the frame type of the first data frame is not adjusted means that the first data frame continues being transmitted, and the second data frame cannot preempt the first data frame for transmission. This implementation may be compatible with an existing transmission manner, to ensure that only one preemptable frame in the network device is preempted for transmission.

In the second possible implementation of step 102, the frame structure and the frame type marks that are defined in the IEEE 802.3br may be still used without extension. That is, a frame structure of a preemptable frame first-fragment is shown in FIG. 2, and a frame structure of a preemptable frame subsequent-fragment is shown in FIG. 3. The network device may determine, by detecting a frame structure of a to-be-transmitted data frame in the network device, whether the third data frame preempted by the first data frame for transmission exists in the network device.

Figure 5:
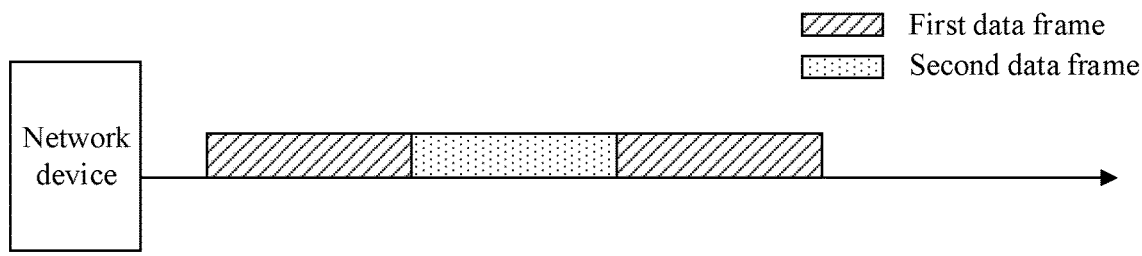
FIG. 5 is a schematic diagram of data frame preemptive-transmission according to an embodiment.

For example, FIG. 5 is a schematic diagram of data frame preemptive-transmission according to an embodiment. As shown in FIG. 5, if the network device obtains, in a process of transmitting a first data frame, a second data frame whose priority is higher than a priority of the first data frame, the network device stops transmitting the first data frame, and starts to transmit the second data frame; and the network device continues to transmit the first data frame after the transmission of the second data frame ends.

Optionally, if the third data frame preempted by the first data frame for transmission exists in the network device, referring to step 102, a data frame preemptive-transmission manner includes two possible implementations.

Figure 6:
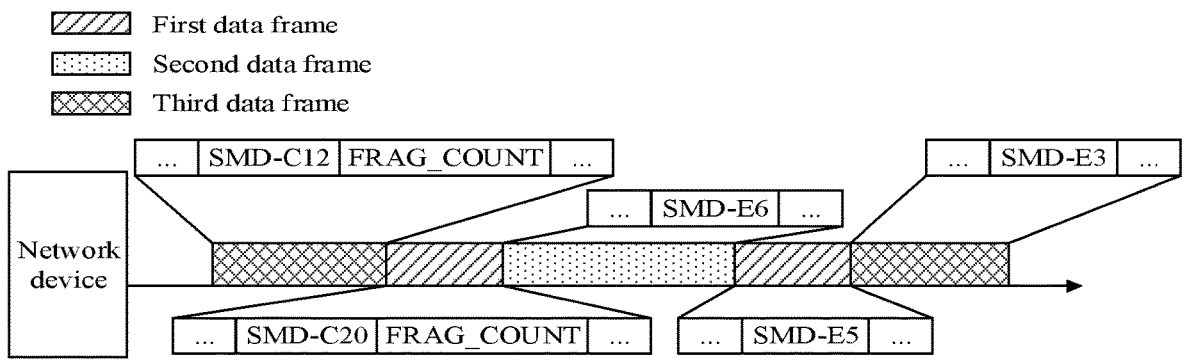
FIG. 6 is another schematic diagram of data frame preemptive-transmission according to an embodiment.
Figure 7:
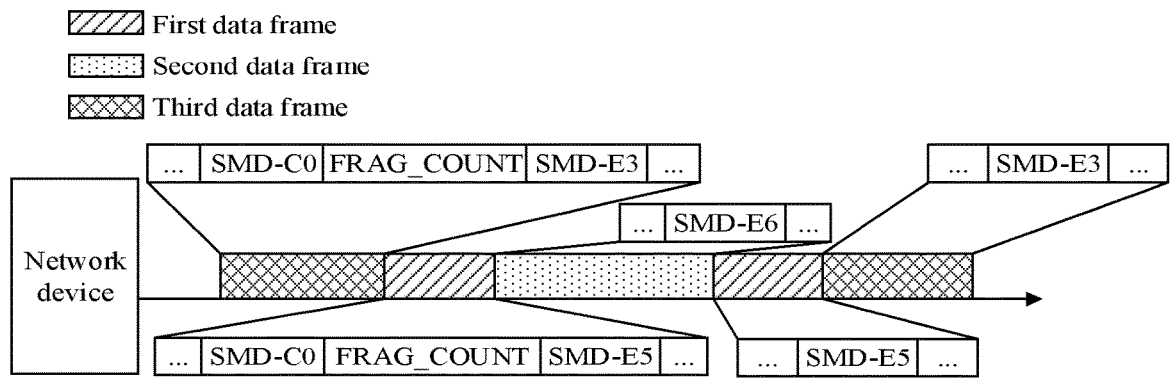
FIG. 7 is still another schematic diagram of data frame preemptive-transmission according to an embodiment.

FIG. 6 and FIG. 7 are schematic diagrams in which preemptive transmission is performed by using the first possible implementation of step 102. As shown in FIG. 6 and FIG. 7, if the network device obtains, in a process of transmitting a third data frame, a first data frame whose priority is higher than a priority of the third data frame, the network device stops transmitting the third data frame, and starts to transmit the first data frame; if the network device further obtains, in a process of transmitting the first data frame, a second data frame whose priority is higher than the priority of the first data frame, the network device stops transmitting the first data frame, and starts to transmit the second data frame; the network device continues to transmit the first data frame after the transmission of the second data frame ends; and the network device continues to transmit the third data frame after the transmission of the first data frame ends. FIG. 6 shows data frame preemptive-transmission in the manner 1. FIG. 7 shows data frame preemptive-transmission in the manner 2. Arrow directions in FIG. 5 to FIG. 7 all indicate data frame transmission directions.

In FIG. 6 and FIG. 7, frame structures of the first data fragment of the first data frame, the second data frame, and the first data fragment of the third data frame are all shown in FIG. 2. For ease of illustration, only a partial frame structure of each data frame is shown in FIG. 6 and FIG. 7. For example, it is assumed that the priority of the third data frame is 3, the priority of the first data frame is 5, the priority of the second data frame is 6, and an initial frame type of the third data frame is an express frame. Referring to FIG. 6 and FIG. 7, a value of an SMD field in the first data fragment of the third data frame is a value (represented by SMD-E3) corresponding to SMD-E3, a value of an SMD field in the first data fragment of the first data frame is a value corresponding to SMD-E5, and a value of an SMD field in the second data frame is a value corresponding to SMD-E6.

In FIG. 6, a subsequent preemptable frame mark is extended to distinguish a data frame to which a preemptable frame subsequent-fragment belongs. Frame structures of the second data fragment of the first data frame and the second data fragment of the third data frame in FIG. 6 are both shown in FIG. 3. Referring to FIG. 6, a value of an SMD field in the second data fragment of the first data frame is a value corresponding to SMD-C20, and a value of an SMD field in the second data fragment of the third data frame is a value corresponding to SMD-C12. A value of a FRAG COUNT field is set in a setting manner in the standard defined in IEEE 802.3br. Details are not described in this embodiment. Based on a correspondence between a preemptable frame mark and an express frame mark, it may be learned that the subsequent preemptable frame mark SMD-C20 corresponds to the express frame mark SMD-E5, and the subsequent preemptable frame mark SMD-C12 corresponds to the express frame mark SMD-E3. Therefore, a data frame to which a preemptable frame subsequent-fragment belongs can be known based on a subsequent preemptable frame mark. The receive end combines the data fragment whose value of the SMD field is SMD-E5 and the data fragment whose value of the SMD field is SMD-C20 (there may be further SMD-C21 and the like), to obtain the first data frame. The receive end combines the data fragment whose value of the SMD field is SMD-E3 and the data fragment whose value of the SMD field is SMD-C12 (there may be further SMD-C13 and the like), to obtain the third data frame.

In FIG. 7, an indication field is added to a frame structure of a preemptable frame subsequent-fragment to distinguish a data frame to which the preemptable frame subsequent-fragment belongs. Frame structures of the second data fragment of the first data frame and the second data fragment of the third data frame in FIG. 7 are both shown in FIG. 4. Referring to FIG. 7, in the second data fragment of the first data frame, a value of an SMD field is a value corresponding to SMD-C0, and a value of an indication field is the value corresponding to SMD-E5 (same as the value of the SMD field in the first data fragment of the first data frame); and in the second data fragment of the third data frame, a value of an SMD field is the value corresponding to SMD-C0, and a value of an indication field is the value corresponding to SMD-E3 (same as the value of the SMD field in the first data fragment of the third data frame). A value of a FRAG COUNT field is set in a setting manner in the standard defined in IEEE 802.3br. Details are not described in this embodiment. It may be understood that, a data frame to which a preemptable frame subsequent-fragment belongs may be directly known based on a value of an indication field. The receive end combines the data fragment whose value of the SMD field is SMD-E5 and all data fragments whose values of indication fields are SMD-E5, to obtain the first data frame. The receive end combines the data fragment whose value of the SMD field is SMD-E3 and all data fragments whose values of indication fields are SMD-E3, to obtain the third data frame.

If the data frame preemptive-transmission manner is the second possible implementation of step 102, if the network device obtains, in a process of transmitting a third data frame, a first data frame whose priority is higher than a priority of the third data frame, the network device stops transmitting the third data frame, and starts to transmit the first data frame; if the network device further obtains, in a process of transmitting the first data frame, a second data frame whose priority is higher than the priority of the first data frame, the network device continues transmitting the first data frame because the first data frame cannot be preempted for transmission because the third data frame preempted by the first data frame for transmission exists in the network device; the network device transmits the second data frame after the transmission of the first data frame ends; and the network device continues to transmit the third data frame after the transmission of the second data frame ends.

Optionally, after the transmission of the second data frame ends, if a to-be-transmitted fourth data frame exists in the network device and a priority of the fourth data frame is higher than the priority of the first data frame, the network device determines a frame type of the fourth data frame as an express frame, and transmits the fourth data frame; and the network device continues to transmit the first data frame after the transmission of the fourth data frame ends. The priority of the fourth data frame is lower than or equal to the priority of the second data frame.

In conclusion, according to the data transmission method provided in this embodiment, when the second data frame whose priority is higher than the priority of the first data frame exists in the process of transmitting the first data frame, the network device determines the frame type of the second data frame as an express frame, and the network device adjusts the frame type of the first data frame to a preemptable frame if the frame type of the first data frame is an express frame. In this embodiment, a frame type of a currently transmitted data frame is dynamically adjusted, so that in the network device, a frame type of a high-priority data frame is an express frame, and a frame type of a low-priority data frame is a preemptable frame. In comparison with a conventional manner in which frame types of data frames are classified into fixed types, a frame type of a data frame can be flexibly determined, to implement multi-level preemption, so that a high-priority data frame flexibly preempts a low-priority data frame, thereby improving data transmission flexibility.

Figure 8:
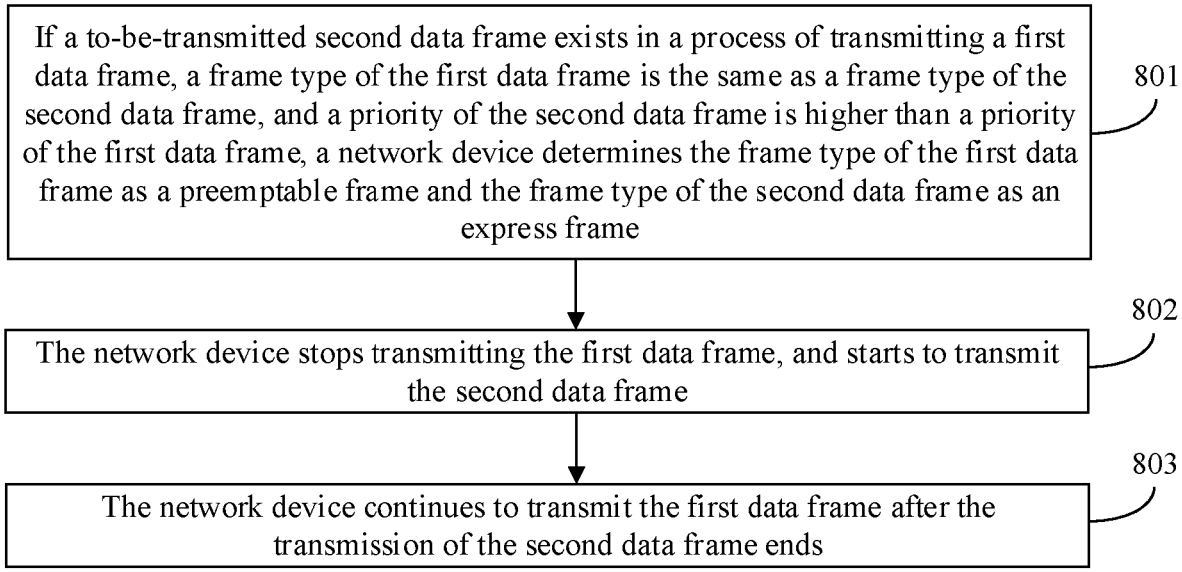
FIG. 8 is a flowchart of another data transmission method according to an embodiment.

FIG. 8 is a flowchart of another data transmission method according to an embodiment. As shown in FIG. 8, the method includes the following steps.

Step 801: If a to-be-transmitted second data frame exists in a process of transmitting a first data frame, a frame type of the first data frame is the same as a frame type of the second data frame, and a priority of the second data frame is higher than a priority of the first data frame, a network device determines the frame type of the first data frame as a preemptable frame and the frame type of the second data frame as an express frame.

For related explanations of the first data frame, refer to the foregoing step 101. Details are not described herein again in this embodiment.

A queue identifier may be set for an egress port queue in this embodiment, the queue identifier is used to indicate a queue type of the egress port queue, and the queue type includes an express queue or a preemptable queue. For example, queue identifiers of egress port queues of priorities 0 to 3 are preemptable identifiers, which indicates that the egress port queues of the priorities 0 to 3 are preemptable queues; and queue identifiers of egress port queues of priorities 4 to 7 are express identifiers, which indicates that the egress port queues of the priorities 4 to 7 are express queues. A frame type of a data frame in the express queue is an express frame, and a frame type of a data frame in the preemptable queue is a preemptable frame. The preemptable identifier and the express identifier may be numbers, characters, or the like. For example, the preemptable identifier is 1, and the express identifier is 0. For another example, the preemptable identifier is P, and the express identifier is E.

Before transmitting a data frame, the network device buffers the to-be-transmitted data frame in a corresponding egress port queue based on a priority of the data frame. Because a frame type of a data frame in each egress port queue is determined, in the process in which the network device transmits the first data frame, a module or a chip that controls data frame transmission can actively detect whether the to-be-transmitted second data frame exists in an egress port queue whose priority is higher than the priority of the first data frame and that has a same queue identifier as an egress port queue to which the first data frame belongs. For example, if the frame type of the first data frame is an express frame and the priority of the first data frame is 6, in the process of transmitting the first data frame, the network device detects whether the to-be-transmitted second data frame exists in an express queue of a priority 7. For another example, if the frame type of the first data frame is a preemptable frame and the priority of the first data frame is 1, in the process of transmitting the first data frame, the network device detects whether the to-be-transmitted second data frame exists in preemptable queues of a priority 2 and a priority 3.

Certainly, alternatively, an egress port queue may send an indication to the module or the chip that controls data frame transmission in the network device, where the indication includes a frame type and a priority of the egress port queue, to notify the module or the chip that controls data frame transmission that a to-be-transmitted second data frame exists, where a frame type of the second data frame is the same as the frame type of the transmitted first data frame, and a priority of the second data frame is higher than the priority of the first data frame.

That the network device determines the frame type of the first data frame as a preemptable frame and the frame type of the second data frame as an express frame includes: if the frame type of the first data frame and the frame type of the second data frame are both express frames, the network device adjusts the frame type of the first data frame to a preemptable frame, without performing any operation on the frame type of the second data frame.

Optionally, that the network device adjusts the frame type of the first data frame to a preemptable frame includes: if the frame type of the first data frame is an express frame, a third data frame preempted by the first data frame for transmission exists in the network device, and a frame type mark of the third data frame is a first preemptable frame mark, the network device adjusts a frame type mark of the first data frame to a second preemptable frame mark, where the second preemptable frame mark is different from the first preemptable frame mark. For this process, refer to the detailed descriptions in the first possible implementation of the foregoing step 102. Details are not described herein again.

Alternatively, that the network device adjusts the frame type of the first data frame to a preemptable frame includes: if the frame type of the first data frame is an express frame, and a third data frame preempted by the first data frame for transmission does not exist in the network device, the network device adjusts the frame type of the first data frame to a preemptable frame. If the frame type of the first data frame is an express frame, and a third data frame preempted by the first data frame for transmission exists in the network device, the network device does not adjust the frame type of the first data frame. For explanations of this process, refer to the detailed descriptions in the second possible implementation of the foregoing step 102. Details are not described herein again.

That the network device determines the frame type of the first data frame as a preemptable frame and the frame type of the second data frame as an express frame alternatively includes: if the frame type of the first data frame and the frame type of the second data frame are both preemptable frames, the network device adjusts the frame type of the second data frame to an express frame, without performing any operation on the frame type of the first data frame.

Step 802: The network device stops transmitting the first data frame, and starts to transmit the second data frame.

For specific details of this step, refer to the related descriptions in the foregoing step 103. Details are not described herein again.

Step 803: The network device continues to transmit the first data frame after the transmission of the second data frame ends.

For specific details of this step, refer to the related descriptions in the foregoing step 104. Details are not described herein again.

In conclusion, according to the data transmission method provided in this embodiment, if the to-be-transmitted second data frame whose frame type is the same as the frame type of the first data frame and priority is higher than the priority of the first data frame exists in the network device in the process of transmitting the first data frame, the network device determines the frame type of the first data frame as a preemptable frame and the frame type of the second data frame as an express frame. In this embodiment, a frame type of a currently transmitted data frame or a frame type of a data frame in an egress port queue is dynamically adjusted, so that in the network device, a frame type of a high-priority data frame is an express frame, and a frame type of a low-priority data frame is a preemptable frame. Therefore, in data frames of a same frame type, a high-priority data frame flexibly preempts a low-priority data frame, thereby improving data transmission flexibility.

In this embodiment, the data transmission method shown in FIG. 1 and the data transmission method shown in FIG. 8 are proposed based on a same concept. A sequence of steps in each of the foregoing data transmission methods may be appropriately adjusted, or a step may be correspondingly added or deleted based on a case. Any variation readily figured out by a person skilled in the art within the disclosed technical scope disclosed shall fall within the protection scope of this disclosure.

Figure 9:
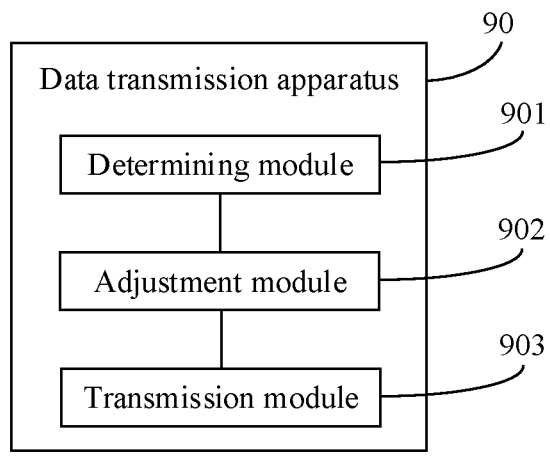
FIG. 9 is a schematic diagram of a structure of a data transmission apparatus according to an embodiment.

FIG. 9 is a schematic diagram of a structure of a data transmission apparatus according to an embodiment. As shown in FIG. 9, the apparatus 90 includes: a determining module 901 configured to: if a to-be-transmitted second data frame exists in a process of transmitting a first data frame, determine a frame type of the second data frame as an express frame, where a priority of the second data frame is higher than a priority of the first data frame; an adjustment module 902 configured to adjust a frame type of the first data frame to a preemptable frame if the frame type of the first data frame is an express frame; and a transmission module 903 configured to: stop transmitting the first data frame, and start to transmit the second data frame.

Optionally, the adjustment module is configured to: if the frame type of the first data frame is an express frame, a third data frame preempted by the first data frame for transmission exists, and a frame type mark of the third data frame is a first preemptable frame mark, adjust a frame type mark of the first data frame to a second preemptable frame mark, where the second preemptable frame mark is different from the first preemptable frame mark. For specific details, refer to the detailed descriptions in the data transmission method shown in FIG. 1. Details are not described herein again.

Optionally, the adjustment module is configured to: if the frame type of the first data frame is an express frame and a third data frame preempted by the first data frame for transmission does not exist, adjust the frame type of the first data frame to a preemptable frame.

Optionally, the transmission module is further configured to continue to transmit the first data frame after the transmission of the second data frame ends. Optionally, the transmission module is further configured to: after the transmission of the second data frame ends, if a to-be-transmitted fourth data frame exists and a priority of the fourth data frame is higher than the priority of the first data frame, determine a frame type of the fourth data frame as an express frame, and transmits the fourth data frame; and continue to transmit the first data frame after the transmission of the fourth data frame ends.

Optionally, the apparatus 90 further includes a buffer module configured to: before transmitting the first data frame, buffer the first data frame in a corresponding egress port queue, for example, a first egress port queue, based on the priority of the first data frame; and further configured to buffer the second data frame in a corresponding egress port queue, for example, a second egress port queue, based on the priority of the to-be-transmitted second data frame.

Optionally, the apparatus 90 further includes an enable/a disable control module configured to control whether the apparatus 90 enables the data transmission method provided in the embodiments. When the apparatus 90 enables the data transmission method provided in the embodiments, the apparatus 90 performs the data transmission method shown in FIG. 1. When the apparatus 90 disables the data transmission method provided in the embodiments, the apparatus 90 executes a conventional frame preemption mechanism.

For details not described herein, refer to the detailed descriptions in the data transmission method shown in FIG. 1.

In conclusion, according to the data transmission apparatus provided in this embodiment, when determining, by using the determining module, that the second data frame whose priority is higher than the priority of the first data frame exists in the process of transmitting the first data frame, a network device determines the frame type of the second data frame as an express frame, and the network device adjusts, by using the adjustment module, the frame type of the first data frame to a preemptable frame if the frame type of the first data frame is an express frame. In this embodiment, a frame type of a currently transmitted data frame is dynamically adjusted, so that in the network device, a frame type of a high-priority data frame is an express frame, and a frame type of a low-priority data frame is a preemptable frame. In comparison with a conventional manner in which frame types of data frames are classified into fixed types, a frame type of a data frame can be flexibly determined, to implement multi-level preemption, so that a high-priority data frame flexibly preempts a low-priority data frame, thereby improving data transmission flexibility.

Figure 10:
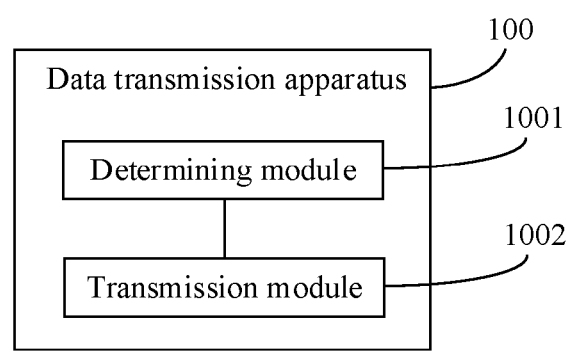
FIG. 10 is a schematic diagram of a structure of another data transmission apparatus according to an embodiment.

FIG. 10 is a schematic diagram of a structure of another data transmission apparatus according to an embodiment. As shown in FIG. 10, the apparatus 100 includes: a determining module 1001 configured to: if a to-be-transmitted second data frame exists in a process of transmitting a first data frame, a frame type of the first data frame is the same as a frame type of the second data frame, and a priority of the second data frame is higher than a priority of the first data frame, determine the frame type of the first data frame as a preemptable frame and the frame type of the second data frame as an express frame; and a transmission module 1002 configured to: stop transmitting the first data frame, and start to transmit the second data frame.

Optionally, the determining module is configured to: adjust the frame type of the first data frame to a preemptable frame if the frame type of the first data frame and the frame type of the second data frame are both express frames; or adjust the frame type of the second data frame to an express frame if the frame type of the first data frame and the frame type of the second data frame are both preemptable frames.

Optionally, the determining module is configured to: if the frame type of the first data frame and the frame type of the second data frame are both express frames, a third data frame preempted by the first data frame for transmission exists, and a frame type mark of the third data frame is a first preemptable frame mark, adjust a frame type mark of the first data frame to a second preemptable frame mark, where the second preemptable frame mark is different from the first preemptable frame mark. For specific implementation details of the preemptable frame mark, refer to the detailed descriptions in the data transmission method shown in FIG. 1. Details are not described herein again.

Optionally, the determining module is configured to: if the frame type of the first data frame and the frame type of the second data frame are both express frames and a third data frame preempted by the first data frame for transmission does not exist, adjust the frame type of the first data frame to a preemptable frame.

Optionally, the transmission module is further configured to continue to transmit the first data frame after the transmission of the second data frame ends.

Optionally, the transmission module is further configured to: after the transmission of the second data frame ends, if a to-be-transmitted fourth data frame exists and a priority of the fourth data frame is higher than the priority of the first data frame, transmit the fourth data frame; and continue to transmit the first data frame after the transmission of the fourth data frame ends.

Optionally, the apparatus 100 further includes a buffer module configured to: before transmitting the first data frame, buffer the first data frame in a corresponding egress port queue, for example, a first egress port queue, based on the priority of the first data frame; and further configured to buffer the second data frame in a corresponding egress port queue, for example, a second egress port queue, based on the priority of the to-be-transmitted second data frame.

Optionally, the apparatus 100 further includes an enable/a disable control module configured to control whether the apparatus 100 enables the data transmission method provided in the embodiments. When the apparatus 100 enables the data transmission method provided in the embodiments, the apparatus 100 performs the data transmission method shown in FIG. 8. When the apparatus 100 disables the data transmission method provided in the embodiments, the apparatus 100 executes a conventional frame preemption mechanism.

For details not described herein, refer to the detailed descriptions in the data transmission methods shown in FIG. 1 and FIG. 8.

In conclusion, according to the data transmission apparatus provided in this embodiment, if the to-be-transmitted second data frame whose frame type is the same as the frame type of the first data frame and whose priority is higher than the priority of the first data frame exists in the process in which a network device transmits the first data frame, the network device determines, by using the determining module, the frame type of the first data frame as a preemptable frame and the frame type of the second data frame as an express frame. In this embodiment, a frame type of a currently transmitted data frame or a frame type of a data frame in an egress port queue is dynamically adjusted, so that in the network device, a frame type of a high-priority data frame is an express frame, and a frame type of a low-priority data frame is a preemptable frame. Therefore, a high-priority data frame flexibly preempts a low-priority data frame, thereby improving data transmission flexibility.

For the apparatus in the foregoing embodiment, a specific manner of performing an operation by each module is described in detail in the embodiments related to the method, and details are not described herein again.

Figure 11:
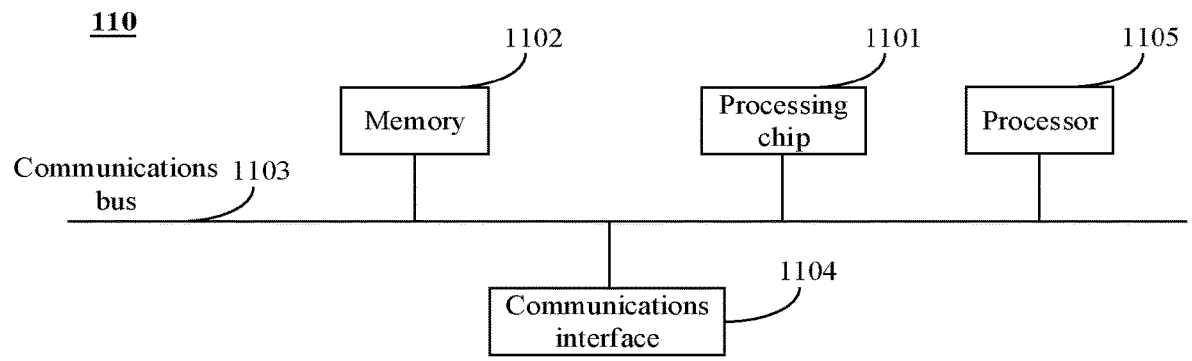
FIG. 11 is a block diagram of a data transmission apparatus according to an embodiment.

FIG. 11 is a block diagram of a data transmission apparatus according to an embodiment. The data transmission apparatus may be a network device, such as a switch or a router. As shown in FIG. 11, the apparatus 110 includes a processing chip 1101. Referring to FIG. 11, the apparatus 110 may further include a memory 1102, a communications bus 1103, and a communications interface 1104. The processing chip 1101, the memory 1102, and the communications interface 1104 are connected to each other by using the communications bus 1103.

The processing chip 1101 includes a programmable logic circuit and/or program instructions. When running the programmable logic circuit and/or the program instructions, the processing chip 1101 implements the data transmission method shown in FIG. 1 or FIG. 8.

Figure 12:
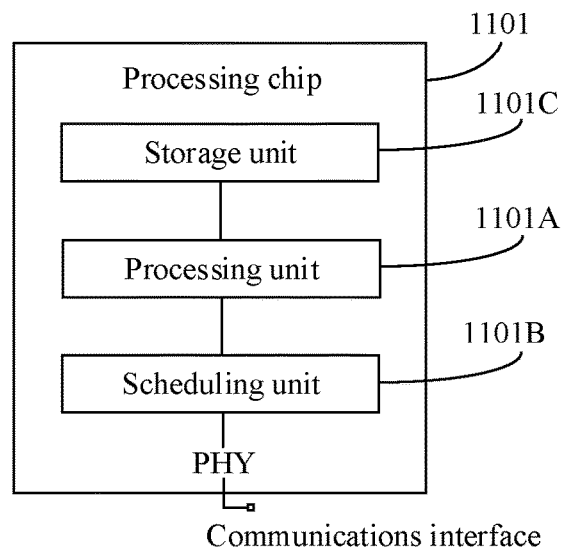
FIG. 12 is a schematic diagram of a structure of a processing chip according to an embodiment.

FIG. 12 is a schematic diagram of a structure of the processing chip 1101 according to an embodiment. As shown in FIG. 12, the processing chip 1101 includes a processing unit 1101A and a scheduling unit 1101B.

The processing unit 1101A may be a central processing unit (CPU), a network processor (NP), or a combination of a CPU and an NP.

Optionally, the memory 1102 is configured to store a computer program, and the computer program includes program instructions. The processing unit 1101A invokes the computer program stored in the memory 1102, and runs the program instructions in the computer program to buffer a to-be-transmitted data frame in a corresponding egress port queue based on a priority of the to-be-transmitted data frame. The to-be-transmitted data frame in the egress port queue may be understood as a packet on which MAC encapsulation is not performed.

The scheduling unit 1101B may be an ASIC, a PLD, or a combination thereof. The PLD may be a complex PLD (CPLD), a field programmable gate array (FPGA), generic array logic (GAL), or any combination thereof. The scheduling unit 1101B runs the programmable logic circuit in the processing chip to schedule the to-be-transmitted data frame in the egress port queue, to implement the data transmission method in FIG. 1 or FIG. 8. Specifically, the scheduling unit is configured to: according to the method in which a high-priority data frame preempts a low-priority data frame for transmission in FIG. 1 or FIG. 8, schedule the data frame in the egress port queue, and adjust or determine a frame type of the data frame. Then, a value corresponding to the frame type is set in an SMD field during MAC encapsulation. Finally, the data frame that carries the frame type (the value of the SMD field) reaches the communications interface 1104 after passing through a physical layer (PHY), and is transmitted from the communications interface 1104 to a receive end. The receive end can determine, based on the value of the SMD field in the data frame, whether the received data frame is an express frame or a preemptable frame preempted for transmission.

Still referring to FIG. 12, the processing chip 1101 further includes a storage unit 1101C, and the storage unit 1101C includes storage space that is set for an egress port queue, to buffer a to-be-transmitted data frame. Optionally, the storage unit 1101C may be configured to store computer program instructions. The processing unit 1101A invokes the computer program instructions stored in the storage unit 1101C, to buffer a to-be-transmitted data frame in a corresponding egress port queue based on a priority of the to-be-transmitted data frame.

Optionally, the memory 1102 may be configured to buffer a to-be-transmitted data frame.

The communications interface 1104 includes a wired communications interface. The wired communications interface includes an Ethernet interface. The Ethernet interface may be an optical interface, an electrical interface, or a combination thereof.

Figure 13:
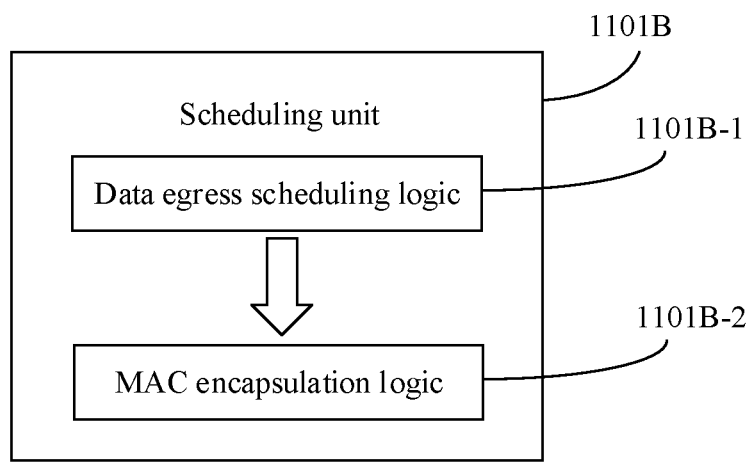
FIG. 13 is a schematic diagram of a structure of a scheduling unit according to an embodiment.

Further, FIG. 13 is a schematic diagram of a structure of the scheduling unit 1101B according to an embodiment. As shown in FIG. 13, the scheduling unit 1101B includes data egress scheduling logic 1101B-1 and MAC encapsulation logic 1101B-2.

The data egress scheduling logic 1101B-1 is configured to schedule the to-be-transmitted data frame in the egress port queue, and provide the MAC encapsulation logic with a frame type indication corresponding to the to-be-transmitted data frame, where the frame type indication is used to indicate the frame type of the to-be-transmitted data frame. The MAC encapsulation logic 1101B-2 is configured to perform MAC encapsulation on the to-be-transmitted data frame based on the to-be-transmitted data frame provided by the data egress scheduling logic 1101B-1 and the frame type indication corresponding to the to-be-transmitted data frame.

In a possible implementation, when providing the MAC encapsulation logic 1101B-2 with the to-be-transmitted data frame, the data egress scheduling logic 1101B-1 provides the MAC encapsulation logic 1101B-2 with the frame type indication corresponding to the data frame. The frame type indication includes a start of packet (SOP), an end of packet (EOP), a start of MAC-merge (SOM), and an end of MAC-merge (EOM). That the SOP is 1 indicates a packet header, that the EOP is 1 indicates a packet trailer, and that the SOP and the EOP are both 0 indicates a packet intermediate fragment. That the SOM is 1 indicates the first preemptable frame subsequent-fragment, that the EOM is 1 indicates the last preemptable frame subsequent-fragment, and that the SOM and the EOM are both 0 indicates an intermediate preemptable frame subsequent-fragment. For example, when providing the MAC encapsulation logic 1101B-2 with a first data frame whose frame type is an express frame, the data egress scheduling logic 1101B-1 sends an indication that an SOP value is 1 and an EOP is 0, next sends an indication that the SOP value is 0 and the EOP is 0, and then sends an indication that the SOP value is 0 and the EOP value is 1 to the MAC encapsulation logic 1101B-2. In this way, the first data frame is transmitted at one time without being preempted for transmission, and an SMD value encapsulated by the MAC encapsulation logic 1101B-2 for the first data frame is SMD-E0. For another example, when providing the MAC encapsulation logic 1101B-2 with a first data frame whose frame type is a preemptable frame, the data egress scheduling logic 1101B-1 sends an indication that an SOP value is 1 and an EOP is 0 to the MAC encapsulation logic 1101B-2, and an SMD value encapsulated by the MAC encapsulation logic 1101B-2 for the first data frame is SMD-S0. Then, the data egress scheduling logic 1101B-1 schedules a second data frame to preempt the first data frame for transmission. Therefore, when providing the MAC encapsulation logic 1101B-2 with the second data frame, the data egress scheduling logic 1101B-1 sends an indication that an SOP value is 1 and an EOP is 0 to the MAC encapsulation logic 1101B-2, and an SMD value encapsulated by the MAC encapsulation logic 1101B-2 for the second data frame is SMD-E1. Then, the data egress scheduling logic 1101B-1 schedules a third data frame to preempt the second data frame for transmission. Therefore, when providing the MAC encapsulation logic 1101B-2 with the third data frame, the data egress scheduling logic 1101B-1 sends an indication that an SOP value is 1 and an EOP is 0 to the MAC encapsulation logic 1101B-2, and an SMD value encapsulated by the MAC encapsulation logic 1101B-2 for the third data frame is SMD-E2. Next, the data egress scheduling logic 1101B-1 continues to transmit the third data frame, sends an indication that the SOP value is 0 and the EOP is 0, and then sends an indication that the SOP value is 0 and the EOP value is 1, and the MAC encapsulation logic 1101B-2 encapsulates SMD-E2 for all subsequent fragments of the third data frame. Next, the data egress scheduling logic 1101B-1 continues to transmit the second data frame, and sends an indication that the SOP value is 0, the EOP is 0, an SOM is 1, and an EOM is 0, and the MAC encapsulation logic 1101B-2 encapsulates SMD-C4 for a preemptable frame subsequent-fragment of the second data frame. Then, the data egress scheduling logic 1101B-1 sends an indication that the SOP value is 0, the EOP is 0, the SOM is 0, and the EOM is 0, and the MAC encapsulation logic 1101B-2 encapsulates SMD-05 for a preemptable frame subsequent-fragment of the second data frame. Then, the data egress scheduling logic 1101B-1 sends an indication that the SOP value is 0, the EOP is 1, the SOM is 0, and the EOM is 1, and the MAC encapsulation logic 1101B-2 encapsulates SMD-C6 for a preemptable frame subsequent-fragment of the second data frame. Next, the data egress scheduling logic 1101B-1 continues to transmit the first data frame, and sends an indication that the SOP value is 0, the EOP is 0, an SOM is 1, and an EOM is 0, and the MAC encapsulation logic 1101B-2 encapsulates SMD-C0 for a preemptable frame subsequent-fragment of the first data frame. Then, the data egress scheduling logic 1101B-1 sends an indication that the SOP value is 0, the EOP is 0, the SOM is 0, and the EOM is 0, and the MAC encapsulation logic 1101B-2 encapsulates SMD-C1 for a preemptable frame subsequent-fragment of the first data frame. Then, the data egress scheduling logic 1101B-1 sends an indication that the SOP value is 0, the EOP is 1, the SOM is 0, and the EOM is 1, and the MAC encapsulation logic 1101B-2 encapsulates SMD-C2 for a preemptable frame subsequent-fragment of the first data frame. If finding that after receiving a previous indication that an SOP value is 1, the MAC encapsulation logic 1101B-2 receives no indication that an EOP value is 1, but further receives an indication that an SOP value is 1, the MAC encapsulation logic 1101B-2 can know that preemptive transmission has occurred. In addition, each time the MAC encapsulation logic 1101B-2 receives a data frame whose SOP value is 1, the MAC encapsulation logic 1101B-2 selects one of SMD-S0 or SMD-E0, SMD-E1, SMD-E2, . . . , and SMD-E7 in sequence and encapsulates the mark for the data frame. When receiving the first data frame whose SOP value is 1, the MAC encapsulation logic 1101B-2 encapsulates SMD-S0 or SMD-E0 for the data frame based on a frame type of the data frame.

In another possible implementation, a data frame provided by the data egress scheduling logic 1101B-1 with the MAC encapsulation logic 1101B-2 carries a frame type indication. A frame type indication of an express frame includes an SOP and an EOP. Similarly, that the SOP is 1 indicates a packet header, that the EOP is 1 indicates a packet trailer, and that the SOP and the EOP are both 0 indicates a packet intermediate fragment. A frame type indication of a preemptable frame includes an SOP, an EOP, an SOM, and an EOM. That the SOM is 1 indicates the first preemptable frame subsequent-fragment, that the EOM is 1 indicates the last preemptable frame subsequent-fragment, and that the SOM and the EOM are both 0 indicates an intermediate preemptable frame subsequent-fragment. Further, the frame type indication may further include priority information, so that the MAC encapsulation logic 1101B-2 can distinguish between intermediate subsequent-fragments. The MAC encapsulation logic 1101B-2 may set a value of an SMD field in a MAC encapsulation header based on the frame type indication carried in the data frame, to obtain the data frame of a corresponding frame type.

There may be a plurality of communications interfaces 1104, and the communications interface 1104 is configured to communicate with another device. For example, in this embodiment, the communications interface 1104 may be configured to receive a data frame and/or send a data frame.

Optionally, the processing chip 1101 further includes a register, and the register includes an enable/a disable flag bit. When the enable/disable flag bit is set to a first value (for example, 1), it indicates that the apparatus 110 enables the data transmission method provided in the embodiments. When the enable/disable flag bit is set to a second value (for example, 0), it indicates that the apparatus 110 disables the data transmission method provided in the embodiments. In this case, the apparatus 110 executes a conventional frame preemption mechanism.

When the enable/disable flag bit is set in the apparatus 110, the processing chip 1101 includes a programmable logic circuit and/or program instructions for implementing the data transmission method shown in FIG. 1 or FIG. 8, and further includes a programmable logic circuit and/or program instructions for implementing the conventional frame preemption mechanism.

The communications interface 1104 may alternatively include a wireless communications interface. The wireless communications interface may be a wireless local area network (WLAN) interface, a cellular network communications interface, a combination thereof, or the like.

Optionally, still referring to FIG. 11, the apparatus 110 may further include a processor 1105 configured to implement a service or function other than the data transmission method provided in this disclosure. The processor may have a single core or a plurality of cores.

An embodiment further provides a computer storage medium. The computer storage medium stores instructions. When the instructions are executed by a processor, the data transmission method shown in FIG. 1 or FIG. 8 is implemented.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

In the embodiments, the terms "first", "second", and "third" are merely used for a purpose of description, and shall not be understood as an indication or implication of relative importance. Unless otherwise explicitly limited, the term "at least one" refers to one or more, and the term "a plurality of" refers to two or more.

The term "and/or" describes only an association relationship for describing associated objects and indicates that three relationships may exist. For example, A and/or B may indicate the following three cases: Only A exists, both A and B exist, and only B exists. In addition, the character "I" in this specification generally indicates an "or" relationship between the associated objects.

The foregoing descriptions are merely optional embodiments, but are not intended to limit this disclosure. Any modification, equivalent replacement, or improvement made without departing from the concept and principle of this disclosure should fall within the protection scope of this disclosure.

What is claimed is:

1. A method comprising:
   determining, in response to a second data frame existing in a process of transmitting a first data frame and in response to a second priority of the second data frame being higher than a first priority of the first data frame, a second frame type of the second data frame as an express frame type, wherein the first data frame comprises a start m delimiter (SMD) field, and wherein the SMD field comprises a value;
   determining a first frame type of the first data frame based on the value;
   adjusting, in response to the first frame type being the express frame type, the first frame type to a preemptable frame type by adjusting a first frame type mark of the first data frame to a second preemptable frame mark;
   stopping transmission of the first data frame; and
   starting transmission of the second data frame.

2. The method of claim 1, wherein adjusting the first frame type mark comprises adjusting the first frame type mark in response to the first frame type being the express frame type, a third data frame preempted by the first data frame existing, and a third frame type mark of the third data frame being a first preemptable frame mark.

3. The method of claim 1, further comprising further adjusting the first frame type to the preemptable frame type in response to a third data frame preempted by the first data frame not existing.

4. The method of claim 1, further comprising:
   completing transmission of the second data frame; and
   resuming, after completing transmission of the second data frame, transmission of the first data frame.

5. The method of claim 4, further comprising:
   determining, after completing transmission of the second data frame and in response to a fourth priority of a fourth data frame being higher than the first priority, a fourth frame type of the fourth data frame as the express frame type;
   transmitting, in response to determining the fourth frame type as the express frame type, the fourth data frame; and
   further resuming, after completing transmission of the fourth data frame, transmission of the first data frame.

6. A method comprising:
   determining a first frame type of a first data frame based on a first value of a first start m delimiter (SMD) field of the first data frame;
   determining a first priority of the first data frame;
   determining a second frame type of a second data frame based on a second value of a second SMD field of the second data frame;
   determining a second priority of the second data frame;
   determining, in response to the second data frame existing in a process of transmitting the first data frame, the first frame type being the same as the second frame type, and the second priority being higher than the first priority, the first frame type as a preemptable frame type and the second frame type as an express frame type;
   adjusting the first frame type to the preemptable frame type by adjusting a first frame type mark of the first data frame to a second preemptable frame mark;
   stopping transmission of the first data frame; and
   starting transmission of the second data frame.

7. The method of claim 6, wherein adjusting the first frame type to the preemptable frame type comprises adjusting, in response to the first frame type and the second frame type both being the express frame type, the first frame type to the preemptable frame type, and wherein the method further comprises adjusting, in response to the first frame type and the second frame type both being the preemptable frame type, the second frame type to the express frame type.

8. The method of claim 7, wherein adjusting the first frame type mark comprises adjusting the first frame type mark in response to the first frame type and the second frame type both being the express frame type, a third data frame preempted by the first data frame existing, and a third frame type mark of the third data frame being a first preemptable frame mark.

9. The method of claim 7, further comprising further adjusting the first frame type to the preemptable frame type in response to a third data frame preempted by the first data frame not existing.

10. The method of claim 6, further comprising resuming, after completing transmission of the second data frame, transmission of the first data frame.

11. The method of claim 10, further comprising:
    transmitting, after completing transmission of the second data frame, in response to a fourth data frame existing, and in response to a fourth priority of the fourth data frame being higher than the first priority, the fourth data frame; and
    resuming, after completing transmission of the fourth data frame, transmission of the first data frame.

12. An apparatus comprising:
a memory configured to store instructions; and
a processor coupled to the memory and configured to execute the instructions to cause the apparatus to:
   determine, when a second data frame exists in a process of transmitting a first data frame and when second priority of the second data frame is higher than a first priority of the first data frame, a second frame type of the second data frame as an express frame type, wherein the first data frame comprises a start m delimiter (SMD) field, and wherein the SMD field comprises a value;
   determine a first frame type of the first data frame based on the value;
   adjust, when the first frame type is the express frame type, the first frame type to a preemptable frame type by adjusting a first frame type mark of the first data frame to a second preemptable frame mark;
   stop transmission of the first data frame; and
   start transmission of the second data frame.

13. The apparatus of claim 12, wherein the processor is further configured to execute the instructions to cause the apparatus to adjust the first frame type mark by adjusting the first frame type mark in response to the first frame type being the express frame type, a third data frame preempted by the first data frame existing, and a third frame type mark of the third data frame being a first preemptable frame mark.

14. The apparatus of claim 12, wherein the processor is further configured to execute the instructions to cause the apparatus to further adjust the first frame type to the preemptable frame type when a third data frame preempted by the first data frame does not exist.

15. The apparatus of claim 12, wherein the processor is further configured to execute the instructions to cause the apparatus to:
   complete transmission of the second data frame; and
   resume, after completing transmission of the second data frame, transmission of the first data frame.

16. The apparatus of claim 15, wherein the processor is further configured to execute the instructions to cause the apparatus to:
   determine, after completing transmission of the second data frame and when a fourth priority of a fourth data frame is higher than the first priority, a fourth frame type of the fourth data frame as the express frame type;
   transmit, in response to determining the fourth frame type as the express frame type, the fourth data frame; and
   further resuming, after completing transmission of the fourth data frame, transmission of the first data frame.

17. An apparatus comprising:
a memory configured to store instructions; and
a processor coupled to the memory and configured to execute the instructions to cause the apparatus to:
   determine a first frame type of a first data frame based on a first value of a first start m delimiter (SMD) field of the first data frame;
   determine a first priority of the first data frame;
   determine a second frame type of a second data frame based on a second value of a second SMD field of the second data frame;
   determine a second priority of the second data frame;
   determine, when the second data frame exists in a process of transmitting the first data frame, the first frame type is the same as the second frame type, and the second priority is higher than the first priority, the first frame type as a preemptable frame type and the second frame type as an express frame type;
   adjust the first frame type to the preemptable frame type by adjusting a first frame type mark of the first data frame to a second preemptable frame mark;
   stop transmission of the first data frame; and
   start transmission of the second data frame.

18. The apparatus of claim 17, wherein the processor is further configured to execute the instructions to cause the apparatus to:
   adjust the first frame type to the preemptable frame type by adjusting, in response to the first frame type and the second frame type both being the express frame type, the first frame type to the preemptable frame type; or
   adjust, in response to the first frame type and the second frame type both being the preemptable frame type, the second frame type to the express frame type.

19. The apparatus of claim 18, wherein the processor is further configured to execute the instructions to cause the apparatus to adjust the first frame type mark by adjusting the first frame type mark in response to the first frame type and the second frame type both being the express frame type, a third data frame preempted by the first data frame existing, and a third frame type mark of the third data frame being a first preemptable frame mark.

20. The apparatus of claim 18, wherein the processor is further configured to execute the instructions to cause the apparatus to further adjust the first frame type to the preemptable frame type when a third data frame preempted by the first data frame does not exist.

* * * * *